Sept. 11, 1923.
A. J. MOTTLAU
1,467,873
SPRING WASHER FOR COASTER BRAKES
Filed Feb. 17, 1922
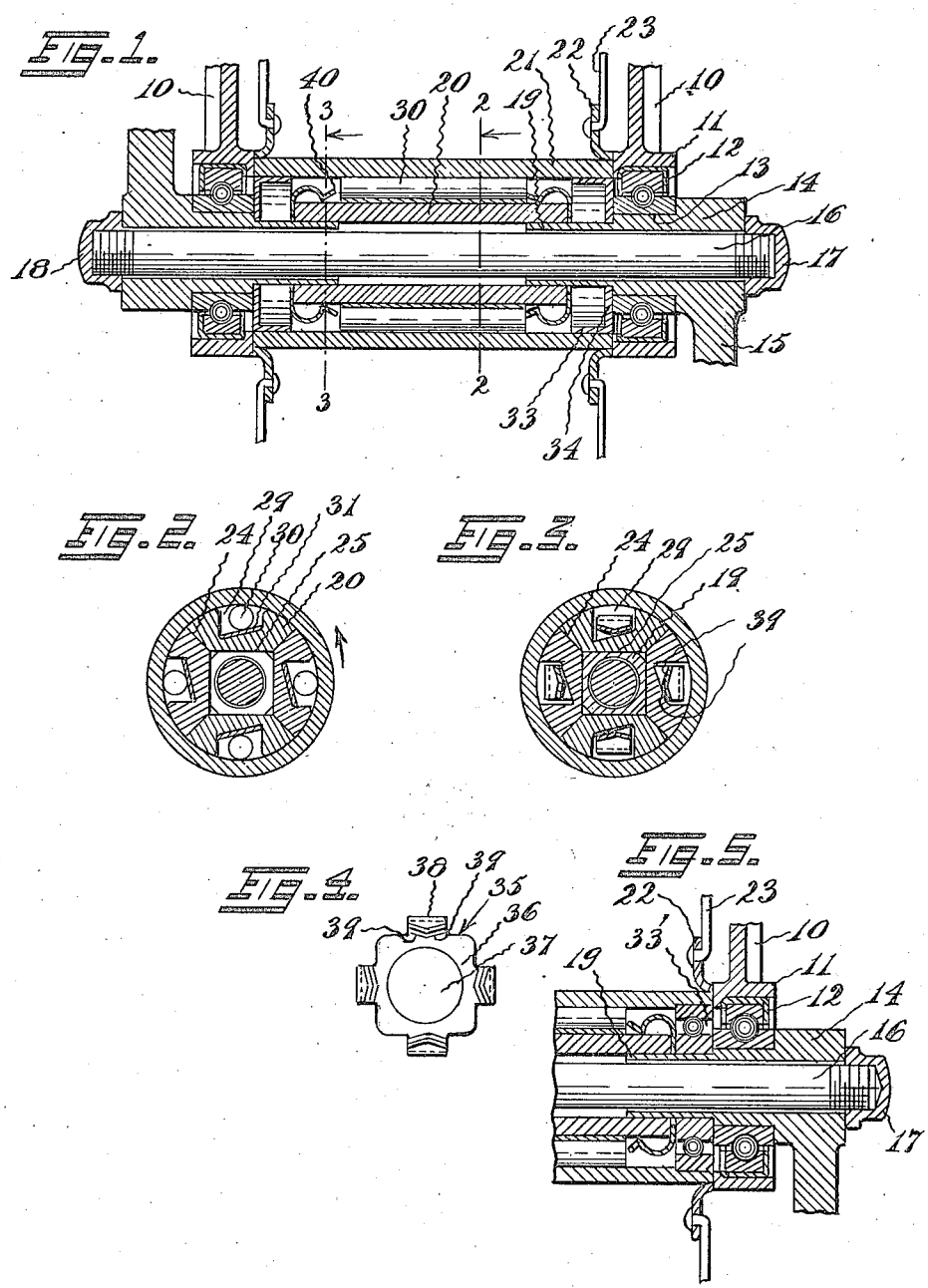
Witnesses:
H. C. Badeau
H. D. Penney
Inventor:
August J. Mottlau,
By his Att'y, F. H. Richards.

Patented Sept. 11, 1923.

1,467,873

UNITED STATES PATENT OFFICE.

AUGUST J. MOTTLAU, OF PHILADELPHIA, PENNSYLVANIA, ASSIGNOR TO A. MECKY COMPANY, OF PHILADELPHIA, PENNSYLVANIA, A CORPORATION OF PENNSYLVANIA.

SPRING WASHER FOR COASTER BRAKES.

Application filed February 17, 1922. Serial No. 537,292.

*To all whom it may concern:*

Be it known that I, AUGUST J. MOTTLAU, a subject of the King of Denmark, residing in Philadelphia, county of Philadelphia, and State of Pennsylvania, have invented certain new and useful Improvements in Spring Washers for Coaster Brakes, of which the following is a specification.

This invention relates to coaster brakes for velocipedes though it is noted that the invention is not limited to velocipedes nor even in some respects to vehicles or brakes.

The invention relates particularly to improvements in the coaster brake shown in my U. S. Patent No. 1,398,883 issued Nov. 29, 1921.

In my said patent, I show, in combination with the branches of the fork of the velocipede, cranks having tubular spindles journalled in said bearings and each formed with a polygonal portion. A set of brake shoes mounted on polygonal portions of the spindles and outwardly actuated by said spindles are provided with end grooves receiving annular split springs tending to retain said shoes in engagement with the spindles. The wheel hub encloses the brake shoes; and clutching rollers disposed in longitudinal recesses of the brake shoes and operative between the hub and the brake shoes for operatively connecting them, are held against endwise movement by said spring.

One object of the invention is to provide an arrangement and device for this kind of brake whereby said end groove and split spring may be done away with, and a more easily manufactured spring washer substituted, thus also doing away with the machine work.

Another object of the invention is to provide a device similar to that of Fig. 5 of said patent in which coasting ball bearings are substituted for the plain bearings of said figure.

Other objects of the invention are to improve generally the simplicity and efficiency of such apparatus and to provide an apparatus of this kind which is durable, economical to manufacture and operate and which will not get out of order.

Other objects of the invention will appear as the description proceeds; and while herein minute details of the invention are described, the invention is not limited to these, since many and various changes may be made without departing from the scope of the invention as claimed.

In the accompanying drawing, showing by way of example two of many possible embodiments of the invention, Fig. 1 is a longitudinal vertical section showing my invention as applied to the driving wheel of a velocipede;

Figs. 2 and 3 are transverse vertical sections taken respectively on the lines 2—2 and 3—3 of Fig. 1, Fig. 2 showing the parts in the positions occupied when power is being transmitted to drive the wheel;

Fig. 4 is an inner side elevation of the spring washer; and

Fig. 5 is a fragmental longitudinal section of a modified form of my invention.

The improved coaster brake is shown in combination with the prongs or branches 10 of the fork of a velocipede, said branches having annular end portions 11 in which are mounted ball bearings 12 for the reception of the cylindrical portions 13 of the tubular spindles 14, which have their outer ends integral with pedal cranks 15. Said tubular spindles are connected and held in place by a bolt 16 extending longitudinally through them and through the cranks 15, said bolt having on its opposite ends nuts 17 and 18, although obviously it may be otherwise constructed.

The inner ends 19 of the crank spindles are externally squared and serve to support convenient number of segmental shoes 20, in the present instance four, whose outer surfaces are cylindrically curved to fit within and substantially fill the cylindrical hub sleeve 21 of the velocipede wheel, of which only said sleeve 21, the end flanges 22 and parts of the spokes 23 are shown.

In the present instance the shoes 20 have radially disposed engaging faces 24 (Fig. 2) and also flat faces 25 for engagement with the flat sides of the square ends 19 of the crank spindles. Each of the shoes 20 is preferably formed with a longitudinally extending recess 29 in its cylindrically curved face for the reception of a clutch roller 30. The bottoms of these recesses are, in the present instance provided with a wear plate 31 on which said roller rests, and are inclined at an acute angle to the adjacent inner surface of the hub sleeve, so that when the shoes are turned in the forward direction all of the rollers are caused to frictionally engage with the hub sleeve. The wear plates may be omitted if desired.

Within each end of the hub sleeve 21, a cylindrical cup-shaped bearing member or piece 33 is mounted on the squared portion 19 of the crank spindle and holds the sleeve out of coasting contact with the shoes 20. The end wall 34 of the member 33 is shown engaging against the cylindrical portion 13, though the bearing member 33 could be reversed if desired. This part of the portion 19 may be squared or cylindrical as desired. Between said members 33 I mount the shoes 20. The opposite ends of the shoes are true planes at right angles to the axes of the shoes, and between the shoes and the bearing members 33 are disposed spring washers 35 (Fig. 4), each comprising a body portion 36 having a central opening 37, here shown round, received over the squared portion 19 of the tubular spindles. Fingers 38 integral with the body portion are inwardly turned and yieldably press against the bottom of the recesses 29 to hold the shoes 20 yieldably inwardly against the squared portions 19.

When viewed from the inner ends (Fig. 3) and in mid-section (Fig. 3), the fingers 38 show a flattened V shape having inner side faces 39, one of which engages flat against the bottom of the recess 29. By having the fingers thus of V-shaped cross-section, one flat face 39 will always engage flat against the bottom of the recess 29 whether the spring washer is at the left or right end of the hub sleeve. Thus the necessity and expense of making separate right and left washers is obviated.

The extreme free ends 40 (Fig. 1) of the fingers 38 is turned away and spaced from the bottom of the recess, and thus engage the ends of the rollers 30 to prevent their longitudinal movement from the recesses 29.

While it is true the various parts are so assembled that the crank spindles are kept from longitudinal movement on the bolt 16, they may none the less be independently turned thereon to a limited extent.

If the cranks 15 be turned in a counter-clockwise direction, as indicated by the arrow in Fig. 2, the shoes 20 on the squared ends 19 of the spindles 14 are necessarily turned with them and at once one or more of the rollers 30 engage with the sleeve 21 with a wedging action and act to frictionally connect said shoes to the hub sleeve 21, thus the sleeve 21 with the wheel attached thereto may thus be turned and the vehicle driven in a forward direction.

If the force applied to rotate the cranks 15 be removed, the wheel is free to turn forward independently of the cranks 15 and shoes 20, and such forward movement, while the cranks do not rotate will cause the rollers 30 to move into inoperative positions (not here shown) at the deepest part of the recesses 29 and out of contact with the sleeve thereby permitting the vehicle to coast. If now one of the pedals be angularly rotated relatively to the other, as would occur for example if the pedals were pressed in opposite directions or if one of them was held and the other pressed backwardly, there is a relative angular displacement of the squared ends 19 of the tubular crank spindles, which forces outwardly the shoes 20 and causes them to exert a frictional braking or retarding force on the rotation of the hub sleeve 21. The forward rotation of the wheel, and forward motion of the vehicle are thus retarded; and this braking action may be stopped by again allowing the pedals and hence the shoes 20 to resume their normal positions under the action of the fingers 38.

Instead of the cup-shaped member 33, I may employ other shapes having suitable bearing surface in engagement with the hub sleeve 21, or the portion 19 (if rounded where engaged by the member 33); or I may use the set of balls bearing generally indicated by reference numeral 33' of Fig. 5. In the latter case, the wheel coasts on the ball bearings 33'.

In both of the herein described forms of my invention it is particularly to be noted that the various parts are of durable and substantial construction and are capable of being easily and quickly assembled, while the device as a whole may be made with a minimum cost. At the same time the construction is simple and certain in its action and of such a nature that under conditions of use there is but little likelihood of its getting out of repair or requiring attention.

I claim:

1. In combination, brake shoes; a sleeve enclosing said brake shoes; means for moving the shoes into braking contact with the sleeves; and spring means having fingers for holding the shoes against braking movement.

2. In combination, rotatable drive members; brake shoes separable by relative rotation of the drive members and rotatable by rotation of the drive members; a sleeve enclosing said brake shoes; and spring washers having in-turned fingers yieldably holding said shoes against separation.

3. In combination, rotatable drive members; brake shoes separable by relative rotation of the drive members and rotatable by rotation of the drive members in the same direction and provided in their outer faces with recesses; having inclined bottoms; a sleeve enclosing said brake shoes; clutch means in said recesses; and spring washers respectively at opposite ends of the brake shoes and each having an opening receiving one of the drive members, and having in-turned fingers disposed in the respective recesses.

4. In combination, rotatable drive members; shoes separable by movement of the drive members and rotatable by the drive members and provided with longitudinal recesses having inclined bottoms; a sleeve enclosing said brake shoes; and spring washers having in-turned fingers disposed in the respective recesses and having intermediate contact portion having an inclined face disposed against said bottom wall.

5. In combination, rotatable drive members; shoes separable by movement of the drive members and rotatable by the drive members and provided with longitudinal recesses having inclined bottoms; a sleeve enclosing said brake shoes; clutch rollers in said recesses; and spring washers having in-turned fingers disposed in the respective recesses and having intermediate contact portions of V-shaped cross-section, said portion having its ridge and one face disposed against said bottom wall.

6. The combination of cranks having spindles formed with portions of other than circular section; relatively rotatable brake shoes mounted on said portions of the spindles and provided in their outer surfaces with longitudinally extending recesses having forwardly inwardly inclined bottom walls; a sleeve enclosing said brake shoes; and rollers in said recesses terminating short of the ends of the recesses for clutching the shoes to the sleeve when they are turned in forward direction; and spring washers respectively disposed against the opposite ends of the brake shoes and each having an opening receiving the spindle, and in-turned fingers disposed in the respective recesses and limiting longitudinal movement of the rollers and having intermediate contact portions of V-shaped cross-section, said portion having its ridge sides and one face disposed against said bottom wall.

7. In combination, rotatable drive members having spindles; relatively rotatable brake shoes mounted on said spindles, separable by relative rotation of the drive members and rotatable by rotation of the drive members in the same direction and provided in their outer faces with longitudinally extending recesses having inclined bottoms; a sleeve enclosing said brake shoes; rollers in said recesses for clutching the shoes to the sleeve when they are turned in forward direction; bearing members carried on said spindles and holding the sleeve out of contact with the shoes when the sleeve rotates relative to the shoes; and spring washers respectively disposed against the opposite ends of the brake shoes between the shoes and said bearing members and each having an opening receiving the spindle, and in-turned fingers disposed in the respective recesses and limiting longitudinal movement of the rollers and having intermediate contact portions of V-shaped cross-section, said portions having its ridge and one face disposed against said bottom wall.

8. In combination, a drive means; a clutch carrying member driven by the drive means and provided with a recess having an inclined bottom; a wear plate disposed against said bottom; a driven member; and a clutch roller in said recess and bearing against the wear plate and adapted to clutch the driven member.

9. In combination, rotatable drive members; brake shoes rotatable by the drive members and provided in their outer faces with longitudinally extending recesses having inclined bottoms; a wear plate disposed against the bottom of each recess; a sleeve enclosing said shoes; and rollers in said recesses and bearing against each wear plate for clutching the sleeve.

10. In combination, rotatable drive members having spindles; relatively movable brake shoes mounted on said spindles, separable by relative rotation of the drive members and rotatable by the drive members where the drive members are rotated in the same direction, said shoes being provided in their outer faces with longitudinally extending recesses having inclined bottoms; a wear plate disposed against the bottom of each recess; a sleeve enclosing said brake shoes; and rollers in said recesses and bearing against each wear plate for clutching the shoes to the sleeve when they are turned in forward direction.

11. In combination, rotatable drive members having spindles; brake shoes mounted on said spindles and separable by relative movement of the drive members and rotatable by the drive members and provided in their outer faces with longitudinally extending recesses having inclined bottoms; a sleeve enclosing said brake shoes; rollers in said recesses for clutching the shoes to the sleeve when they are turned in forward direction; and bearing members carried on said spindles and holding the sleeve out of contact with the shoes when the sleeve rotates relative to the shoes.

12. In combination, rotary driving members; a driven member; means interposed between said driving and driven members for driving the driven member when the driving members are turned in one direction; and bearing members for holding the driven member out of supporting contact with said means when the driven member rotates relative to the drive members.

13. In combination, rotary driving members; clutch carrying members rotatable by the driving members; a driven member; clutch means interposed between said carrying members and driven member for driving the driven member when the drive members are turned in one direction; and bearing members carried on said driving members and forming bearing support for the driven member when the driven member rotates relative to the drive members.

14. In combination, co-axial rotary driving members adapted for concurrent or relative movement or rest; brake members susceptible to braking movement by relative movement of said driving members, and rotatable by movement of the driving members in the same direction; a driven member engageable by said brake members by said braking movement; clutch means interposed between said brake members and driven member for driving the driven member when the brake members are rotated in one direction; and bearing members carried on said driving members and forming bearing support for the driven member for holding the driven member out of contact with the brake members when the driven member rotates relative to the drive members.

15. In combination, co-axial rotary driving members adapted for concurrent or relative movement or rest; brake members relatively movable from each other by relative movement of said driving members, and rotatable by concurrent movement of the driving members; a driven member enclosing said brake members; clutch means interposed between said brake members and driven member for clutching the brake members to the driven member when the brake members are turned in one direction; and bearing members carried on said driving members and forming bearing support for the driven member for holding the driven member out of contact with the brake members when the driven member rotates relative to the drive members.

16. The combination of cranks having spindles formed with portions of other than circular section; relatively rotatable brake shoes mounted on said portions of the spindles and provided in their outer faces with longitudinally extending recesses having forwardly inwardly inclined bottom walls; a sleeve enclosing said brake shoes; and rollers in said recesses for clutching the shoes to the sleeve when they are turned in forward direction; and cup-shaped bearing members carried on said spindles and forming bearing support for the sleeve when the sleeve rotates relative to the shoes.

17. The combination of cranks having spindles formed with portions of other than circular section; relatively rotatable brake shoes mounted on said portions of the spindles and provided in their outer faces with longitudinally extending recesses having forwardly inwardly inclined bottom walls; a sleeve enclosing said brake shoes; rollers in said recesses for clutching the shoes to the sleeve when they are turned in forward direction; and ball bearings the races of which respectively are carried on said spindles and form bearing support for the sleeve out of contact with the shoes when the sleeve coasts relative to the shoes.

AUGUST J. MOTTLAU.

Witnesses:
ALFRED H. FRANK,
EDITH McGUIGAN.